/ 17/79

United States Patent [19]
Milton et al.

[11] 4,149,770
[45] Apr. 17, 1979

[54] SINGLE-FIBER DUPLEX COUPLER

[75] Inventors: A. Fenner Milton, Washington, D.C.; Carl A. Villarruel, Alexandria, Va.

[73] Assignee: The United States of America as represented by the Secretary of the Navy, Washington, D.C.

[21] Appl. No.: 853,656

[22] Filed: Nov. 21, 1977

[51] Int. Cl.² ............................................... G02B 5/14
[52] U.S. Cl. .............................. 350/96.15; 350/96.16
[58] Field of Search ............... 350/96.15, 96.16, 96.18, 350/96.19, 96.21; 250/227

[56] References Cited
U.S. PATENT DOCUMENTS

| 3,902,786 | 9/1975 | Brown | 350/96.16 |
| 4,021,099 | 5/1977 | Kawasaki et al. | 350/96.21 |
| 4,068,952 | 1/1978 | Erbert et al. | 350/96.16 |
| 4,076,375 | 2/1978 | Muska et al. | 350/96.15 |

OTHER PUBLICATIONS
"Simple Coupler Taps Fiber-Optic Cables" Electronics, Dec. 20, 1973, p. 30.

*Primary Examiner*—Rolf G. Hille
*Attorney, Agent, or Firm*—R. S. Sciascia; Philip Schneider; Melvin L. Crane

[57] ABSTRACT

A bidirectional optical communication system which includes a transmission line which directs radiation onto a reflective surface through which a smaller-diameter fiber is inserted. The smaller-diameter fiber directs radiation into the larger-diameter fiber for transmission away from the reflective surface simultaneous with radiation transmitted through the larger-diameter fiber toward the reflective surface. A reflective surface and small fiber may be at each end of the larger-diameter fiber for bidirectional operation.

4 Claims, 2 Drawing Figures

SINGLE-FIBER DUPLEX COUPLER

BACKGROUND OF THE INVENTION

This invention relates to optical communication systems and more especially to a duplex coupler for a single-fiber optical-data transmission line which will allow simultaneous bidirectional communication over a single multimode optical fiber.

Heretofore bidirectional optical communication has been carried out by use of multifiber cables and hollow cables with appropriate connectors. Also single fibers have been used where separate fibers have been used for transmission in opposite directions. Bidirectional single-fiber optical-data transmission lines are useful where weight is of concern such as on aircraft, ships and spacecraft, as well as other situations where only a single fiber can be used.

SUMMARY OF THE INVENTION

This device allows both a source and a detector to be coupled to a single multimode optical-fiber transmission line which may be directional to allow simultaneous bidirectional communication. Single fibers may be coupled to single fibers for transmission and detection at one or both ends. A source fiber which is smaller than a transmission fiber, protrudes through a 45° reflector and is positioned to abut the larger transmission line so as to transmit optical data into the transmission line. Optical data may be transmitted simultaneously toward the source and reflected off the 45° surface to a detector. The source fiber closely abuts the transmission line, thus providing a high efficiency in the input transmission.

DETAILED DESCRIPTION

Figure 1:
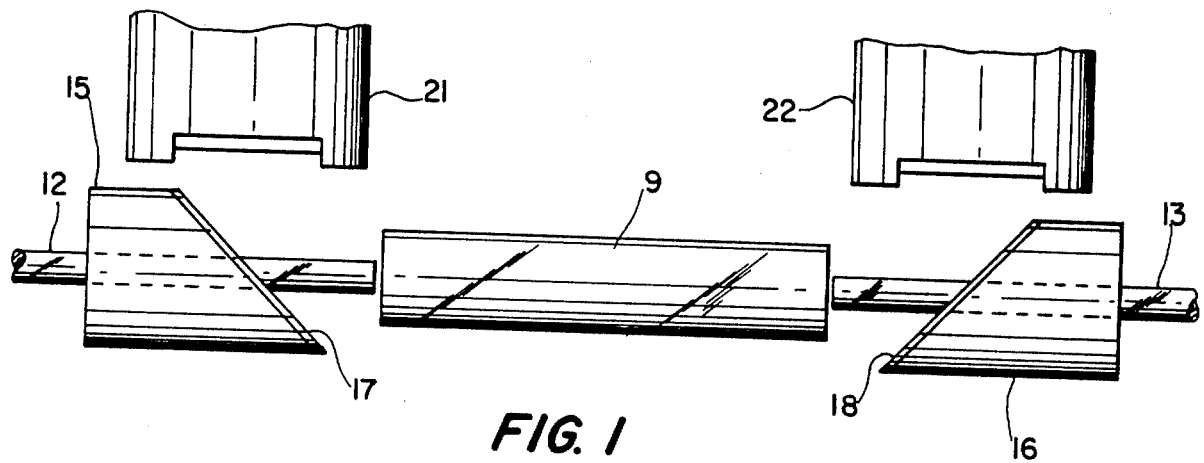
FIG. 1 illustrates a duplex, single-fiber, optical communication system.
Figure 2:
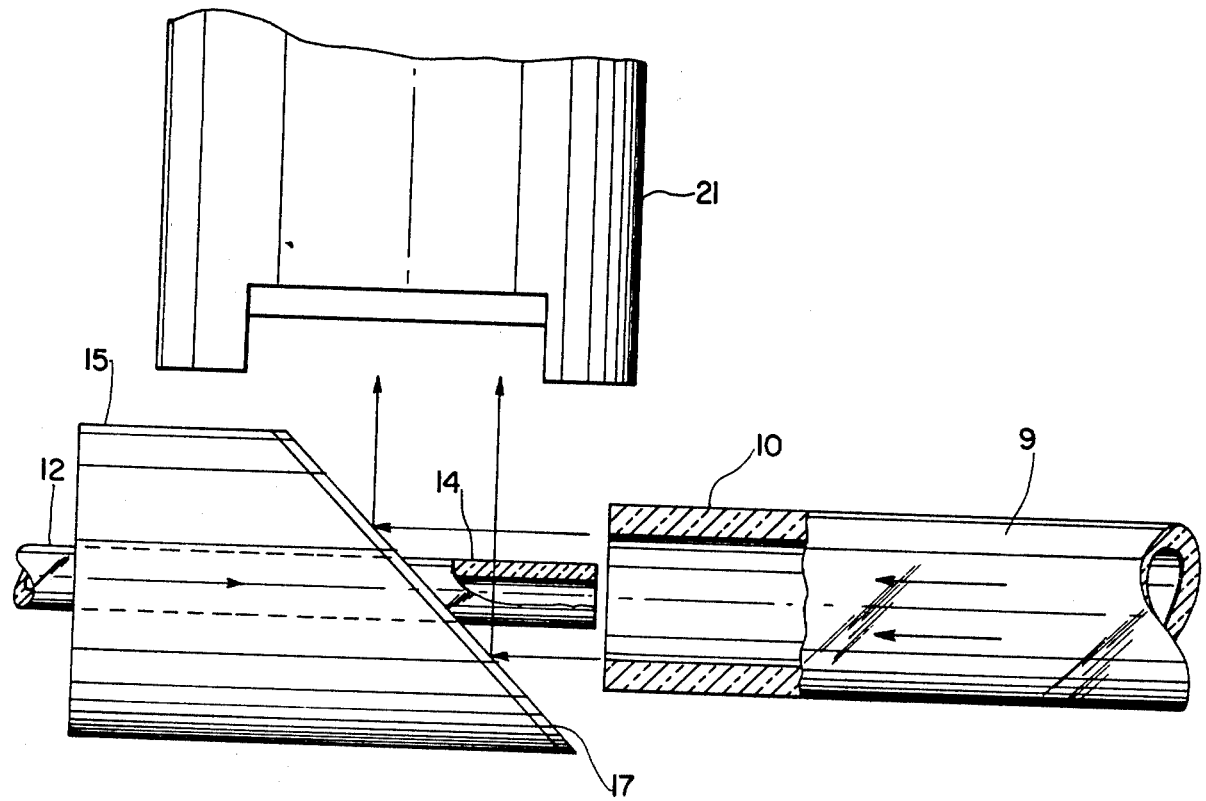
FIG. 2 is an enlarged, partially sectioned view of one end of the system shown by FIG. 1.

The duplex optical communication system of this invention includes a single-fiber optical-data transmission line 9 which has a cladding 10. The transmission line will allow simultaneous bidirectional communication. Small-diameter input fibers 12 and 13 with a thin cladding 14 are each embedded in a larger-diameter tube 15, 16. The larger-diameter tube is cut at a 45° angle with respect to the axis of the transmission line and of the input fiber which is in axial alignment with the transmission line. The facings of the angular cut tubes are provided with highly reflective surfaces 17, 18 such as a mirror. The input fibers have a smaller diameter than that of the transmission line and the transmission line has a diameter the same size or smaller than the tubes 15, 16. Detectors/receivers 21, 22 are positioned to receive radiation reflected by the 45°-angle reflective surface.

As shown, the output ends of the input fibers are positioned in abutting relationship with the transmission line. Therefore the input fibers are end-coupled into the transmission line. Radiation input into one end of the transmission line will emerge from the opposite end and be reflected by the reflective surface to the detector. Since optical data may be coupled into the transmission line from each source, the data will simultaneously traverse the transmission line in opposite directions. Therefore the optical data may be transmitted in one direction or both directions, as desired.

Each input fiber is made with a thin cladding and is as small in core diameter as can be handled in the system. One type of transmission fiber that can be used is a low-loss, graded-index or step-index corning fiber. The light in the transmission line fiber is confined to a core region. The transmission line must have a core diameter larger than the input fiber and may otherwise be of any standard single-fiber-type with a glass or plastic cladding. The diameter of the transmission line will depend upon the percent of the signal desired to be reflected into the detector. It is obvious that a small portion of the transmitted signal will enter the input line and be lost.

The tube 15, 16, which surrounds the input fiber and has the 45° reflection plane can be made of metal or a glass capilliary tube with the angular end polished to a high reflectivity. Of course, a mirrored surface may be applied to the 45° end of any suitable material to provide the reflective surface.

In operation, a source optical signal directed into input fiber 12 is transmitted through input fiber 12 and coupled into transmission line 9. The coupled signal is transmitted through transmission line 9 onto the reflective surface 18 opposite the end of the transmission line 9. The reflective surface 18 reflects the signal onto the detector/receiver 22. A small portion of the transmitted signal will enter the end of the opposite input fiber 13 and will be lost. However, since the input fiber 13 is very small, the lost signal will not be very great. An optical source signal directed into input 13 will be coupled into transmission line 9, transmitted to the reflective surface 17 and detector/receiver 21. Signals may be transmitted simultaneously in each direction or separately at different times over the same transmission line.

The system described herein allows both a source and a detector to be coupled to each end of a single-fiber optical-data transmission line for sending and/or receiving optical data. The input signal may be of any radiation type that can be transmitted through an optical fiber.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A single-fiber duplex coupler which comprises:
   a single-fiber optical-data transmission line having a core and a first and second end;
   a first optical signal input means having a smaller outer dimension than that of the core of said transmission line positioned adjacent said first end of said transmission line with an end in axial alignment with said first end of said transmission line;
   a first reflective surface surrounding said first optical signal input means, spaced from said first end of said transmission line and positioned at an angle relative to the axis of said transmission line;
   a first detector positioned relative to said first reflective surface for receiving an optical signal transmitted from the first end of said transmission line onto said first reflective surface and reflected thereby;
   a second optical signal input means having a smaller outer dimension than that of the core of said transmission line, positioned adjacent said second end of said transmission line with its adjacent end portion in axial alignment with said second end of said transmission line;

a second reflective surface surrounding said second optical signal input means and positioned at an angle relative to the axis of said transmission line; and a second detector positioned relative to said second reflective surface for receiving an optical signal transmitted from the second-end of said transmission line onto said second reflective surface and reflected thereby, whereby optical signals may be transmitted and received simultaneously at each end of said first and second ends of said transmission line.

2. A duplex coupler as claimed in claim 1 wherein: said first and second optical signal input means are single optical fibers, each of which have a smaller diameter than the core diameter of said single-fiber optical data transmission line.

3. A duplex coupler as claimed in claim 2 wherein: said first reflective surface is positioned at a 45° angle with respect to the axis of said first end of said transmission line and said second reflective surface is positioned at a 45° angle with respect to the axis of said second end of said end of said transmission line.

4. A duplex coupler as claimed in claim 2 wherein: said first optical signal input means abuts said first end of said single fiber optical data transmission line and said second optical signal input means abuts said second end of said single fiber optical data transmission line.

* * * * *